(12) United States Patent
Egner-Walter et al.

(10) Patent No.: US 7,676,881 B2
(45) Date of Patent: Mar. 16, 2010

(54) ADAPTER FOR A WIPER BLADE

(75) Inventors: Bruno Egner-Walter, Heilbronn (DE); Michael Schäuble, Bietigheim-Bissingen (DE)

(73) Assignee: Valeo Systemes D'Essuyage, La Verriere (FR)

( * ) Notice: Subject to any disclaimer, the term of this patent is extended or adjusted under 35 U.S.C. 154(b) by 1004 days.

(21) Appl. No.: 10/533,668

(22) PCT Filed: Oct. 29, 2003

(86) PCT No.: PCT/EP03/12000
§ 371 (c)(1),
(2), (4) Date: Mar. 8, 2006

(87) PCT Pub. No.: WO2004/041605
PCT Pub. Date: May 21, 2004

(65) Prior Publication Data
US 2006/0143848 A1    Jul. 6, 2006

(30) Foreign Application Priority Data
Nov. 4, 2002   (DE) .................................. 102 51 520

(51) Int. Cl.
*B60S 1/40*   (2006.01)
(52) U.S. Cl. ................. 15/250.32; 15/250.351
(58) Field of Classification Search .............. 15/250.32, 15/250.351, 250.43, 250.44
See application file for complete search history.

(56) References Cited
U.S. PATENT DOCUMENTS

| | | | |
|---|---|---|---|
| 4,007,511 A | 2/1977 | Deibel | |
| 4,083,642 A | 4/1978 | Journee | |
| 4,132,490 A | 1/1979 | Journee | |
| 4,158,513 A | 6/1979 | Journee | |
| 4,446,589 A * | 5/1984 | Maiocco | 15/250.32 |
| 4,970,751 A * | 11/1990 | Fisher et al. | 15/250.32 |
| 5,715,563 A * | 2/1998 | Marks | 15/250.32 |
| 6,434,780 B1 | 8/2002 | Kotlarski | |
| 6,553,607 B1 | 4/2003 | De Block | |
| 6,910,244 B2 | 6/2005 | De Block et al. | |
| 7,493,672 B2 * | 2/2009 | Op't Roodt | 15/250.32 |

FOREIGN PATENT DOCUMENTS

| | | |
|---|---|---|
| DE | 10 10 0847 A1 | 7/2002 |
| DE | 101 08 200 | 8/2002 |
| WO | 03/051688 * | 6/2003 |

\* cited by examiner

*Primary Examiner*—Gary K Graham
(74) *Attorney, Agent, or Firm*—Jacox, Meckstroth & Jenkins

(57) ABSTRACT

The invention relates to an adapter for adapting a main bracket of a wiper blade to the coupling section of a wiper arm of a wiper mechanism. Said adapter comprises an insertion pin, which is held at one end and which is provided for being laterally inserted into a locating opening on the main bracket, whereby said locating opening extends transversal to the wiper blade longitudinal axis. The adapter also comprises a cylindrical cavity which is provided on the insertion pin, has an insertion opening and which serves to accommodate a pivot pin of the coupling section of the wiper arm. A first bearing section is provided in the area of the insertion opening and is provided for resting against the area of the coupling section that holds the pivot pin. The adapter has a second bearing section located on the side opposite the insertion opening and is provided for resting against the stop of a projection of the coupling section, whereby said projection overlaps, at least in sections, the adapter when mounted.

14 Claims, 2 Drawing Sheets

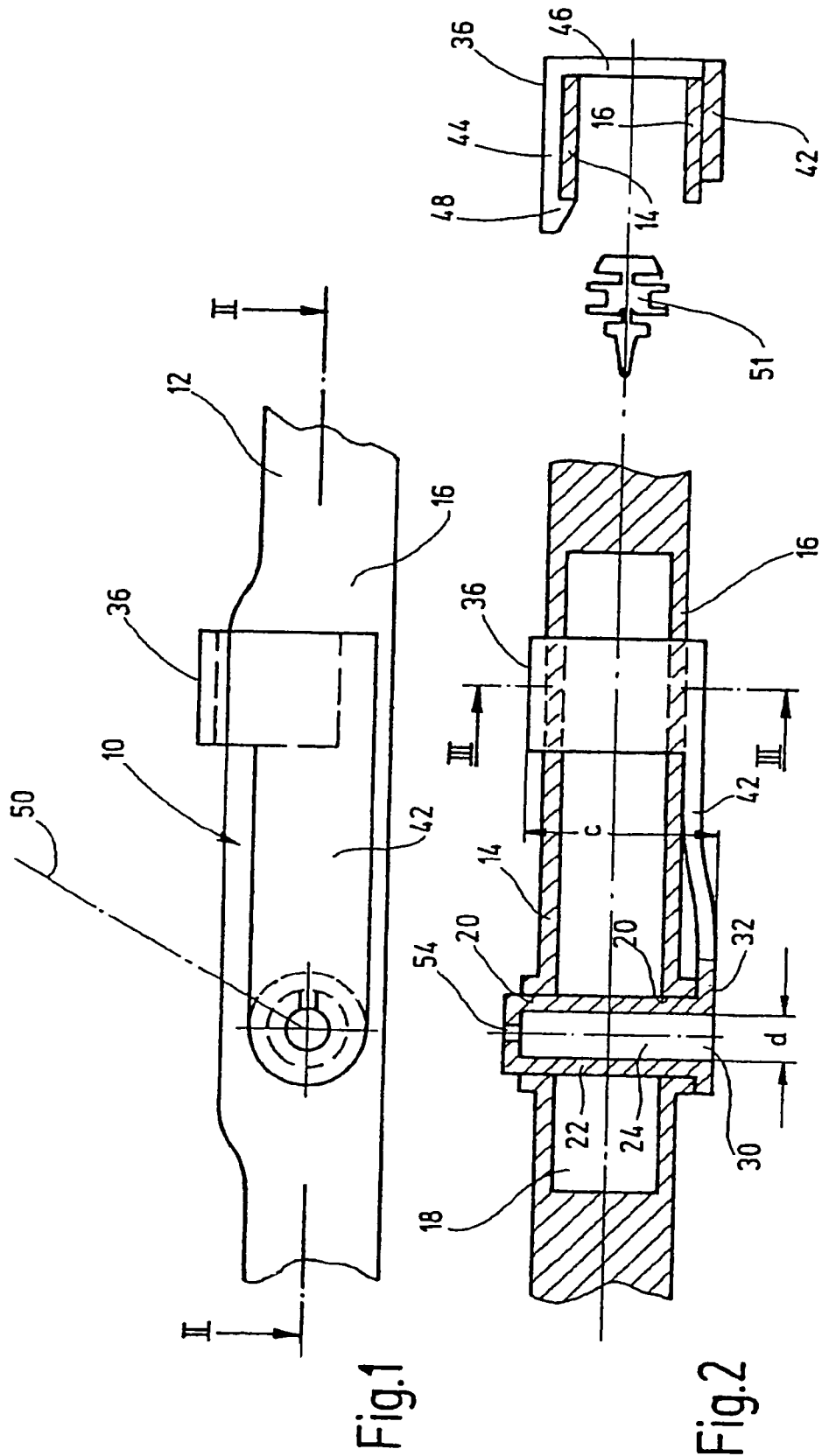

ADAPTER FOR A WIPER BLADE

BACKGROUND OF THE INVENTION

The invention relates to an adapter for adapting the main yoke of a wiper blade to the coupling portion of a wiper arm of a wiper device for flat wiper blades.

Vehicles are becoming increasingly common which have wiper devices comprising so-called "flat wiper blades". The flat wiper blades are distinguished in that they do not comprise a cascade-like yoke system, but rather one or more appropriately pre-curved resilient supporting elements extending in the longitudinal direction of the wiper blade. Under the application force, such a wiper blade lies over its entire length with its wiper lip against the screen surface to be wiped. A tension builds up in the resilient supporting element, which ensures that the wiper squeegee lies properly against the screen over its entire length.

Vehicles are becoming increasingly common which have wiper devices comprising so-called "flat wiper blades". The flat wiper blades are distinguished in that they do not comprise a cascade-like yoke system, but rather one or more appropriately pre-curved resilient supporting elements extending in the longitudinal direction of the wiper blade. Under the application force, such a wiper blade lies over its entire length with its wiper lip against the screen surface to be wiped. A tension builds up in the resilient supporting element, which ensures that the wiper squeegee lies properly against the screen over its entire length.

To attach such a flat wiper blade to the free end of the wiper arm, it has become known from WO 00/73113 A1 to construct the coupling portion of the wiper arm with a joint pin arranged at one end and with a cross-sectionally L- or U-shaped shoulder. The shoulder here comprises a lateral limit stop extending transversely of the longitudinal axis of the joint pin, which limit stop is arranged at a distance from the axis of the joint pin in the longitudinal direction of the wiper arm. Through this special construction of the coupling portion of the wiper arm and a complementary construction of the attachment portion of the wiper blade, as described in WO 00/73113 A1, rapid and simple detachment may be achieved by swivelling of the wiper blade.

However, it has emerged that only those flat wiper blades provided therefor can be arranged on the coupling portion of such wiper arms. Flat wiper blades are not very common and are therefore not widely available.

SUMMARY OF THE INVENTION

The object of the present invention is therefore to ensure that proper windscreen wiping can be achieved even when flat wiper blades with a specially constructed attachment portion are not available.

This object is achieved by an adapter, having an insertion pin mounted at one end for lateral introduction into a receiving opening, on the main yoke, extending transversely of the longitudinal axis of the wiper blade, having a cylindrical recess for accommodating a joint pin of the coupling portion of the wiper arm, said cylindrical recess being provided on the insertion pin and comprising an insertion opening, wherein a first contact portion is provided in the area of the insertion opening for the area of the coupling portion holding the joint pin to rest against, and wherein the adapter comprises a second contact portion arranged on the side remote from the insertion opening for the limit stop to rest against of a shoulder of the coupling portion overlapping the adapter at least in places in the assembled state.

In this way, it is advantageously ensured that even known, internationally available yoke-system wiper blades, as have been used for decades, can be arranged on the wiper arm of a wiper device provided for flat wiper blades. Consequently, the adapter according to the invention means that the operating safety of the corresponding vehicle may be ensured even without the originally provided flat wiper blade by using an available yoke-system wiper blade. To fit the adapter, the adapter is inserted laterally with the insertion pin into the receiving opening in the main yoke. The adapter is then swivelled about the axis of the insertion pin into the final fitted position.

In order to allow a degree of swivelling of the wiper blade relative to the wiper arm, it is advantageous for the first and/or second contact portion to be of raised construction in the transverse direction, such that, in the assembled state, they project beyond the respective side wall of the main yoke. In this way, defined contact points are achieved between the adapter and coupling portion. The first contact portion is preferably arranged at a distance from the second contact portion in the longitudinal direction of the wiper blade.

The cylindrical recess, which serves to accommodate the joint pin of the wiper arm, may take the form, for example, of a through-hole or a blind hole. Use of a blind hole contributes to fitting reliability to the extent that the joint pin of the wiper arm may only be introduced into the cylindrical recess in one direction. When providing a blind hole as cylindrical recess, it is advantageous to provide a ventilation hole in the base area of the blind hole. In this way, rainwater which penetrates into the blind hole is able to dry up, for example.

Depending on the width of the main yoke or depending on the reach of the securing portion of the wiper arm, the second contact portion of the adapter comprises at least to some extent a cheek which, in the assembled state, grips at least in part around a side wall of the main yoke. In this way, lateral forces acting on the wiper blade are reliably diverted into the wiper arm.

Depending on the embodiment of the main yoke and of the coupling portion of the wiper arm, the contact portion is of L- or U-shaped cross-section.

To achieve low-play guidance between the adapter and the coupling portion of the wiper arm and/or of the main yoke, a further embodiment of the invention provides for the width, extending in the transverse direction, of the contact portion to be gripped around in extensively form-fitting manner in the assembled state by the shoulder and limit stop of the coupling portion of the wiper arm.

In the assembled state, the adapter may be mounted either non-rotatably on the main yoke or non-rotatably on the wiper arm. If the adapter is mounted non-rotatably on the wiper arm, this has the advantage that wear arises on the moving parts between the wiper blade and the adapter, so meaning that the wearing parts are replaceable parts. The coupling portion of the wiper arm is not then subject to any wear.

For non-rotatable mounting of the adapter, it is possible for the adapter to comprise at least one catch portion for latching together with the main yoke or the shoulder or limit stop of the wiper arm. It is advantageous for the catch portion or the catch portions to be arranged on the contact portion or on at least one cheek of the contact portion.

In order to achieve secure latching on the main yoke or the shoulder, provision may be made for the catch portion or the catch portions to be arranged at the free end or free ends of the cheeks of the corresponding contact portion. In this way, the corresponding side wall of the main yoke is not only gripped around but also gripped behind.

The adapter is preferably so constructed that a leg extending in the longitudinal direction of the wiper blade is provided between the insertion pin and the second contact portion, which leg rests in the assembled state at least in places against the side wall facing it of the main yoke. In order not to cause any additional air resistance, the leg does not protrude in side view beyond the side walls of the main yoke.

DESCRIPTION OF THE DRAWINGS

Further advantages and advantageous developments of the invention are revealed by the following description, in which the invention is described in more detail and explained with reference to the exemplary embodiments illustrated in the drawings, in which:

FIG. 1 is a side view of a first adapter according to the invention, fitted on the main yoke of a wiper blade, FIG. 2 shows a section along line II-II through the main yoke according to FIG. 1;

FIG. 3 shows a second line III-III in FIG. 2;

DETAILED DESCRIPTION OF THE INVENTION

Figures 4, 5:
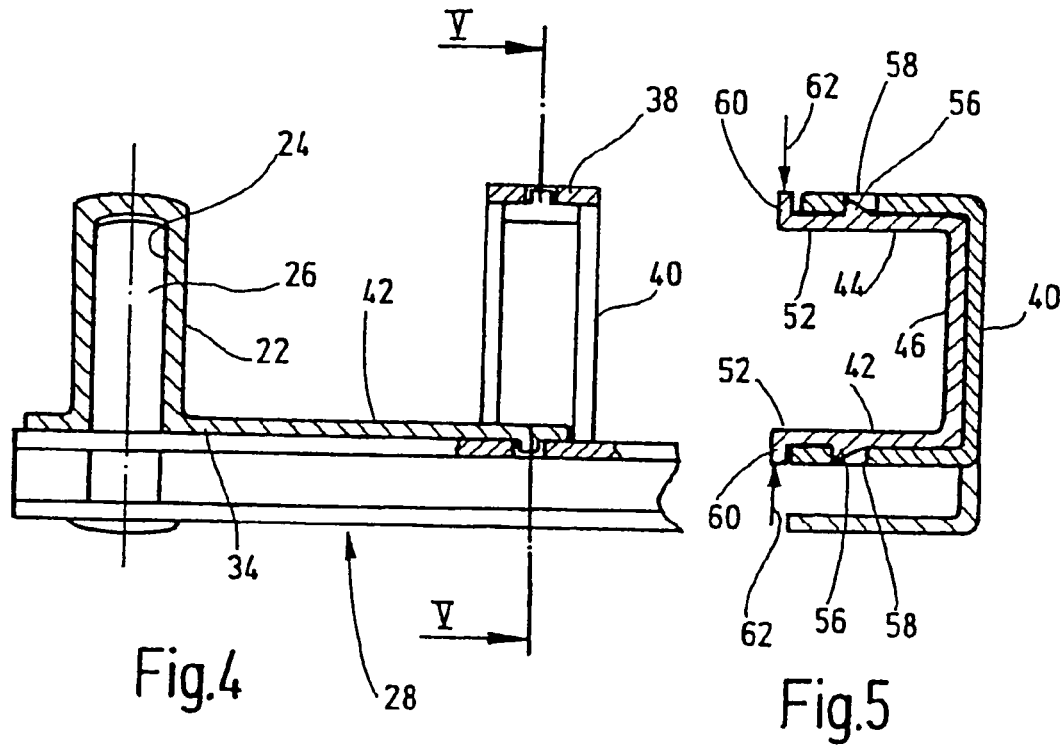
FIG. 4 shows a partially cut-away view from below of a second adapter according to the invention on a coupling portion of a wiper arm.
FIG. 5 shows a second along line V-V in FIG. 4.
Figure 6:
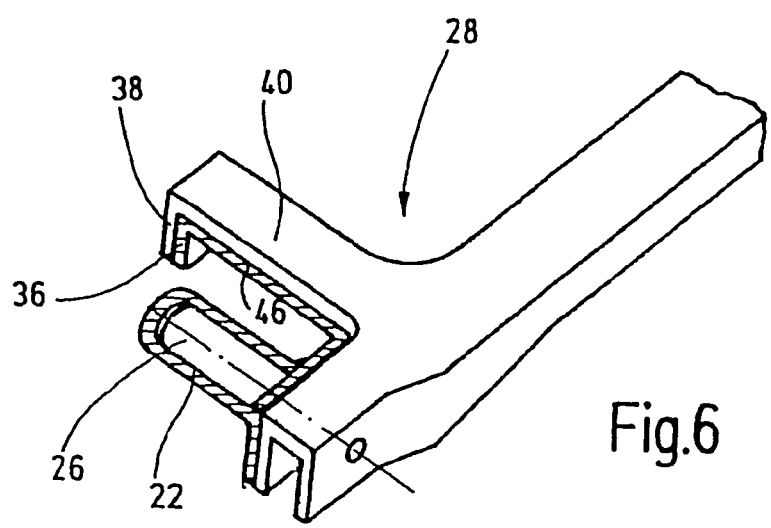
FIG. 6 is a perspective view of the adapter according to FIG. 4, obliquely from above.

The adapter 10 according to the invention illustrated in FIGS. 1 to 3 is arranged on a main yoke 12 of a yoke-system wiper blade of cascade-type construction (not shown). The main yoke 12 comprises two side walls 14, 16, which define a suspension box 18. The two side walls 14, 16 (FIG. 2) in each case provide or comprise a receiving opening 20 extending transversely of the longitudinal axis, into which an insertion pin 22 of the adapter 10 mounted at one end has been introduced. The insertion pin 22 comprises a cylindrical recess 24 for accommodating a joint pin 26, which, in FIGS. 4 and 6, is arranged on the coupling portion 28 of a wiper arm, not shown. As is made clear by FIG. 2, the adapter 10 comprises a first contact portion 32 in the area of the insertion opening 30, against which portion 32 the area 34 of the coupling portion 28 holding the joint pin 26 may rest. On the side remote from the insertion opening 30, the adapter 10 comprises a second contact portion 36. The second contact portion 36 serves to accommodate a limit stop 38 of a shoulder 40 of the coupling portion 28 overlapping the adapter 10 in the assembled state at least in places.

In the case of the adapter illustrated in FIGS. 1 to 3, the first contact portion 32 and the second contact portion 36 are of raised construction in the transverse direction, such that they project beyond the side walls 14, 16 when fitted to the main yoke 12 illustrated in FIG. 3. In this way it is ensured that there is no direct contact between the coupling portion 28 and the main yoke 12. It is likewise clear from FIG. 2 that the first contact portion 32 is arranged at a distance from the second contact portion 36 in the longitudinal direction.

Between the first contact portion 32 and the second contact portion 36, the adapter 10 comprises a longitudinally extending leg 42. As is clear from FIG. 1, the leg 42 is narrower than the side walls 14, 16, such that it does not project beyond the side walls 14, 16.

The second contact portion 36 is of U-shaped cross section, as shown in FIG. 3, wherein a cheek 44 is provided which rests against the side wall 14. The cheek 44, which is clearly visible in particular in FIG. 3, comprises a catch lug 48 on the side remote from the back 46 of the contact portion 36 and gripping behind the side wall 14.

To fit the adapter 10 to the main yoke 12, the insertion pin 22 is introduced into the receiving opening 20. The adapter 10 is then located in a position indicated by the line 50 (FIG. 1) relative to the main yoke 12. After the insertion pin 22 has been inserted into the main yoke 12, the adapter 10 is swivelled into the position illustrated in FIG. 1. The catch lug 48 then catches behind the side wall 14, as illustrated in FIG. 3.

In addition to the main yoke 12 and the adapter 10, FIG. 3 shows a squeegee 51 arranged on the wiper blade.

According to the invention, it is additionally feasible for a catch lug, not shown, likewise to be provided on the edge 52 of the leg 42 remote from the back 46, which catch lug catches behind the side wall 16.

As is clear from FIG. 2, the cylindrical recess 24 comprises a ventilation opening 54 at its end remote from the insertion opening 30.

The distance designated c in FIG. 2 between the first contact portion 32 and the second contact portion 36 must be so dimensioned as to ensure guidance with little play when the adapter 10 is fitted on the coupling portion 28. In addition, the diameter d of the cylindrical recess 24 is selected such that guidance with little play is ensured for the joint pin 26.

The adapter 10 illustrated in FIGS. 1 to 3 is held non-rotatably on the main yoke 12 in the assembled state.

In contrast to the adapter 10, the adapter 100 illustrated in FIGS. 4 to 6 is not held non-rotatably on the main yoke 12, but rather on the coupling portion 28 of the wiper arm. The adapter 100 comprises, for this purpose, in the area of its second contact portion 36 of U-shaped cross-section, two outwardly projecting catch lugs 56. As is clear in particular from FIG. 5, in the assembled state the catch lugs project into catch recesses 58 present on the coupling portion 28. The coupling portion 28 illustrated in FIGS. 4 to 6 corresponds substantially to a coupling portion, as has become known from WO 00/73113 A1.

At the edges 52 of the adapter 100 remote from the back 46, actuating portions 60 are provided which allow demounting of the adapter 100 from the coupling portion 28. The actuating portions 60 are moved towards one another in the direction of arrows 62 for demounting purposes. In this way the catch lugs 56 move out of the catch recesses 58, and the adapter 100 may be swivelled about the axis of the cylindrical recess 24 or of the joint pin 26 for the purpose of detachment from the coupling portion 28.

The adapter 100 according to FIGS. 4, 5 and 6 has the advantage, that all the wearing parts are renewed when the wiper blade and adapter 100 are replaced. The coupling portion 28 is not then subject to any wear.

As a result of the adapter 10, 100 according to the invention, it is possible for known yoke-system wiper blades to be arranged on the coupling portion 28 actually provided for flat wiper blades.

The invention claimed is:

1. In combination, an adapter coupling a main yoke of an elongated wiper blade to a coupling portion of a wiper arm of a wiper device, the adapter being elongated and having an insertion pin mounted at one end laterally introduced into a receiving opening, on one side of the main yoke, extending transversely of the longitudinal axis of the wiper blade, the adapter having a cylindrical recess accommodating a joint pin of the coupling portion of the wiper arm, said cylindrical recess being provided on the insertion pin and comprising an insertion opening, wherein a first contact portion is provided in an area around the insertion opening with which an area of the coupling portion holding the joint pin rests against, and wherein the adapter comprises a second contact portion arranged on a side of the yoke remote from the receiving and insertion openings, the second contact portion resting against a limit stop extending from a shoulder of the coupling portion, said shoulder overlapping the adapter and yoke at least in places.

2. The combination according to claim 1, wherein the first contact portion and/or the second contact portion is/are of raised construction in the transverse direction, such that they project beyond the respective side wall of the main yoke.

3. The combination according to, claim 1, wherein the first contact portion is arranged at a distance from the second contact portion in the longitudinal direction of the wiper blade.

4. The combination according to claim 1, wherein the cylindrical recess takes the form of a through-hole or a blind hole.

5. The combination according to claim 1, wherein the second contact portion comprises at least to some extent a cheek which grips at least in part around at least one side wall of the main yoke.

6. The combination according to claim 1, wherein the second contact portion is of L- or U-shaped cross-section.

7. The combination according to claim 1, wherein a width, extending in the transverse direction, of the second contact portion is gripped around in extensively form-fitting manner by the shoulder and limit stop of the coupling portion of the wiper arm.

8. The combination according to claim 1, wherein the adapter is held non-rotatably on the main yoke.

9. The combination according claim 1, wherein the adapter is held non-rotatably on the coupling portion of the wiper arm.

10. The combination according to claim 1, wherein the adapter comprises at least one catch portion for latching together with the main yoke and/or the coupling portion.

11. The combination according to claim 10, wherein the at least one catch portion is arranged on the second contact portion.

12. The combination according to claim 10, wherein, the at least one catch portion is arranged at a free end of the second contact portion.

13. The combination according to claim 10, wherein between the insertion pin and the second contact portion the adapter comprises a leg extending in the longitudinal direction of the wiper blade, which leg rests at least in places against a side wall of the main yoke.

14. The combination according to claim 13, wherein the leg does not project beyond the side walls of the main yoke.

* * * * *